J. H. MERRILL.
Sorghum Evaporator.
No. 47,970.
Patented May 30, 1865.
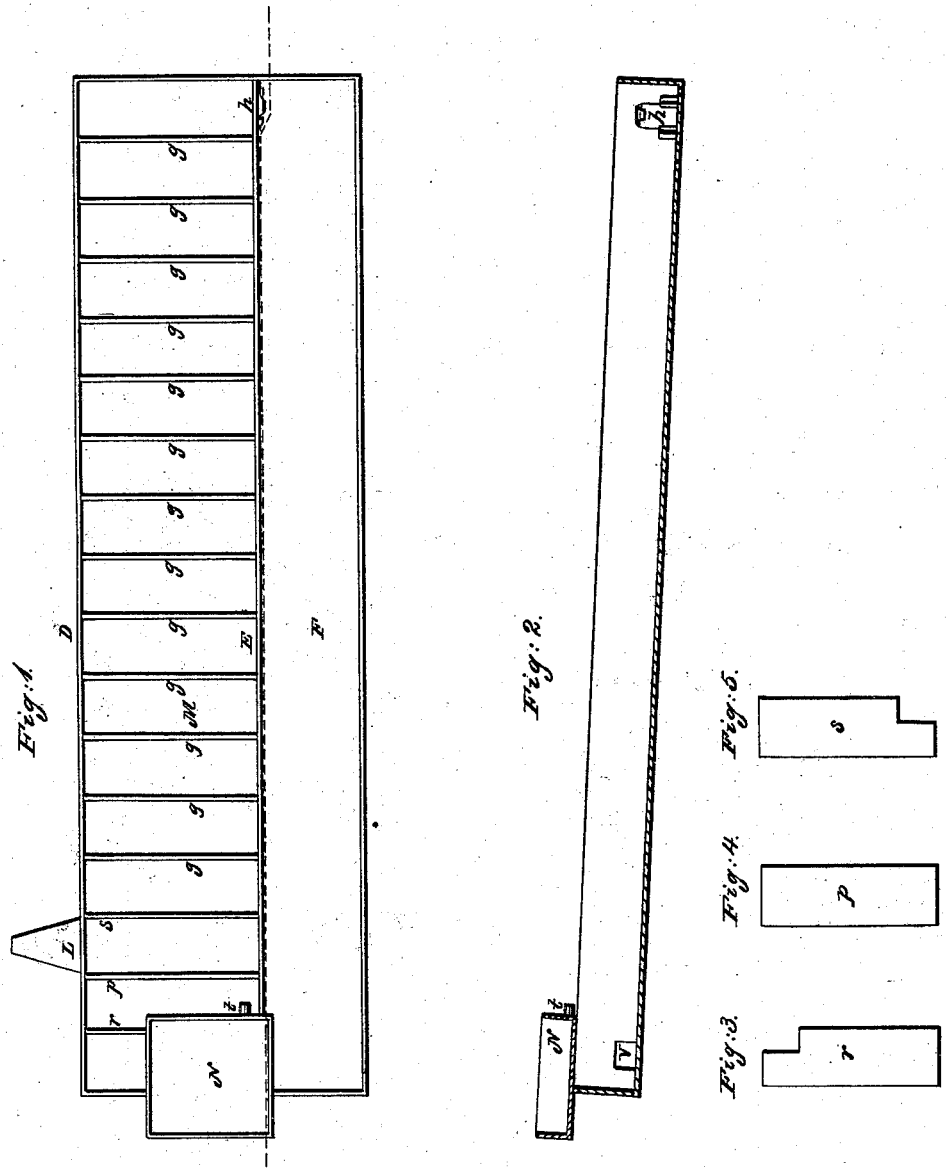

UNITED STATES PATENT OFFICE.

J. H. MERRILL, OF QUASQUETON, IOWA.

IMPROVED SORGHUM-EVAPORATOR.

Specification forming part of Letters Patent No. 47,970, dated May 30, 1865.

*To all whom it may concern:*

Be it known that I, J. H. MERRILL, of Quasqueton, in the State of Iowa, have invented certain new and useful Improvements in Apparatus for Boiling Sorghum-Juice; and I hereby declare that the following is a true and exact description of the same, reference being had to the accompanying drawings, and to the letters of reference marked thereon.

The nature of my invention consists in the use of certain mechanical devices for the purpose of filtering the sorghum-juice before it leaves the evaporator.

Figure 1 in the annexed drawings represents a plan view of my evaporator. Fig. 2 gives a side elevation of the same. Figs. 3, 4, and 5 represent side elevations of the three first partitions placed near the head of the evaporator.

The letter D represents the evaporator, which consists of an oblong metal pan with the partition E running lengthwise through it, dividing A into two unequal parts, the greater space M being cut up into a number of compartments by the division-plates $g$. These compartments have at alternate ends an opening at the lower edge, (see Figs. 3 and 5,) for the purpose of giving a passage to the juice from the lower to the upper end of the larger compartment or division M.

N represents a small square pan placed on the top and extending a little beyond the end of evaporator A. Pan N rests on the end of A and extends inward a little inside of division $r$, and has near its bottom the spout $t$, for conveying the sorghum-juice into the space between divisions $r$ and P. As there is no opening at the bottom of P, the juice cannot escape in the direction of the lower end of compartment M, but will find a vent through $r$, and from $r$ through an opening at the bottom of division-plate E, and then flow down to the lower end of compartment F, where it will again find admittance into compartment M through an opening which can be closed or opened by the gate $h$. The pan N is designed to have its bottom covered with straw for filtering the juice before it enters the evaporator D. It will be observed that when the juice or sirup leaves the pan N through the spout $t$ it will enter the space between $r$ and P, and, escaping thence through the opening in $r$, it will flow into compartment F through the opening V, and will continue its course to the lower end of F and enter compartment M through an opening in division-plate E, the gate $h$ being raised to give it ingress. The juice will now find its way to the upper end of the compartment M and enter the space between division $r$ and division $s$ nearest to $r$. From thence it is discharged through spout L into the vessel prepared to receive it.

The advantages of my evaporator consist in the following particulars: As the juice passes through the length of the defecating compartment F, it can be thoroughly skimmed of all impurities. When the juice enters the compartment M, it will pursue a zigzag course, by reason of the openings in division $g$ being at alternate ends, until it reaches its point of discharge at spout L. The juice will thus be exposed to the action of the fire in a degree proportioned to the extent of the surface over which it passes. The end of the evaporator where the gate $h$ is placed will be about three inches lower than the opposite end, so that its contents will be at least three inches deep at this point before the juice can be discharged through spout L. The depth of the juice where the heat is greatest will prevent it from being burned.

Having thus described my invention, what I claim, and desire to secure by Letters Patent, is—

The pan N, in combination with the evaporator D, the whole constructed and arranged as and for the purpose substantially as herein set forth.

J. H. MERRILL.

Witnesses:
JAMES E. HENRY,
R. W. JOHNSON.